Feb. 6, 1962 W. S. EVERETT 3,019,818
SURGE DISSIPATING APPARATUS
Filed Nov. 3, 1958

INVENTOR.
WILHELM S. EVERETT
BY Elliott & Pastoriza
ATTORNEYS

United States Patent Office 3,019,818
Patented Feb. 6, 1962

3,019,818
SURGE DISSIPATING APPARATUS
Wilhelm S. Everett, P.O. Box 169, Santa Paula, Calif.
Filed Nov. 3, 1958, Ser. No. 771,278
6 Claims. (Cl. 138—30)

This invention generally relates to fluid surge dissipating apparatus, and more particularly concerns an improved apparatus for and method of attenuating sudden pressure surges in a fluid line as a consequence of valve closure or the like.

The method and apparatus of the present invention may be advantageously employed under fluid flow conditions in which water hammer or equivalent pressure surge conditions are brought about in the event of valve closure. Of course, such problems are particularly prevalent in instances in which relatively rigid pipe lines are involved and/or in comparatively high velocities of flow characterize the application. It will be evident, however, that the method and apparatus of the present invention have applicability under other equivalent conditions.

In this regard, by a reversal of certain parts and operating functions, the apparatus and method of the present invention may be embodied in fluid systems subject to sudden pressure decreases as well as pressure increases.

With the above conditions in mind, it is an object of the present invention to provide a method and apparatus for attenuating sudden pressure drops or surges in a fluid line.

Another object of the present invention is to provide a method of attenuating sudden pressure waves in a fluid line and preventing resurgence therein.

Another object of the present invention is to provide an apparatus for attenuating sudden pressure drops or surges in a fluid line which may be economically manufactured with a minimum number of parts and of limited overall dimensions.

Another object of the present invention is to provide an apparatus for attenuating sudden pressure waves in a fluid line which embodies means for not only dissipating initial pressure waves but also for preventing the possibility of resurges in the fluid line.

Still another object of the present invention is to provide an apparatus for attenuating sudden pressure waves in a fluid line which is simple and rugged in construction, and which does not require any appreciable maintenance over a long period of life.

These and other objects of the present invention are generally achieved in a preferred embodiment by providing a method of attenuating sudden pressure surges in a fluid line comprising the steps of establishing a throttled connection between the fluid line and a chamber to thereby absorb by friction a portion of the kinetic energy of said pressure surges. The next step consists of causing the fluid flowing into the chamber to perform work by movement of a member biased against movement, whereby another portion of the kinetic energy of the pressure surges in the line is absorbed. The final step consists in thereafter establishing a condition of restricted flow between the chamber and the line so as to prevent resurge pressure waves to the line.

In accordance with the features of the present invention, a preferred apparatus for carrying out the method consists in the combination of a closed casing and a fluid passage communicating between the interior of the casing and the fluid line subject to pressure surges. Throttle valve means are interposed in the fluid passage to frictionally absorb a part of the kinetic energy characterizing the pressure surges. In addition, compressible means are coupled to and disposed within the casing with the compressible means being adapted to absorb another part of the kinetic energy characterizing the pressure surges.

Desirably, the throttle valve means further embody means for preventing resurges to the fluid line.

A better understanding of the method and apparatus of the present invention will be had by reference to the drawings showing merely an illustrative embodiment thereof, and in which.

Figure 1:
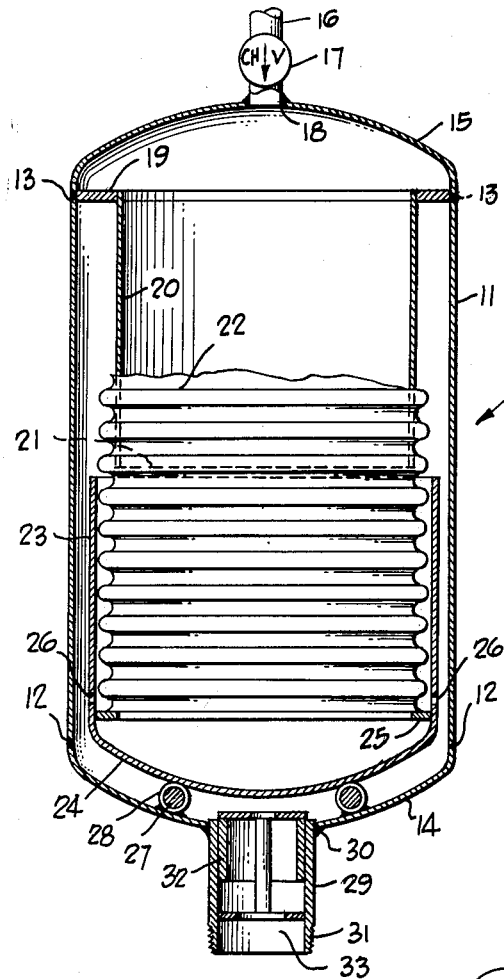
FIGURE 1 is a longitudinal sectional view of an apparatus according to the present invention for attenuating sudden pressure surges in a fluid line.

Referring now to the drawings, there is shown in FIGURE 1 enclosed housing means or a closed casing 10, which is preferably formed of a cylindrical section 11 welded or otherwise circumferentially connected together at 12 and 13 to semi-elliptical head sections 14 and 15, respectively.

A gas inlet line 16 communicates through a check valve 17 to sealably connect with an opening 18 in the head 15.

An annular member or ring 19 is secured within the shell 11 and has rigidly secured thereto a cylindrical liner 20 having an end face 21 located in the intermediate length of the casing 10. Encircling the liner 20 is an elongated bellows 22 which extends throughout the length of liner 20 into contact with the lower surface of the ring 19, as viewed in FIGURE 1. For clarity, the bellows 22 has been shown broken off as indicated.

Surrounding the lower portion of the bellows 22, as viewed in FIGURE 1, is a bellows guide or shroud 23, which is closed off at its lower end by a head 24. A ring 25 is disposed within the shroud 23 and forms a means of connecting the adjacent end of bellows 22 for movement with the shroud 23 in a manner that will be hereafter described. The shroud 23 is adidtionally provided with a plurality of circumferentially spaced drain holes 26 disposed about its periphery.

The head 24 of the shroud 23 is spaced from the head 14 of the shell 11 by stop means in the form of a ring stop member 27. The stop member 27 preferably comprises reinforced steel or the like provided with circumferentially spaced increased diameter flange portions 28.

A pipe 29 defines a fluid passage communicating in sealed relationship with an opening 30 in the lower head 14. The pipe 29 is threaded at its lower end as indicated at 31 in order to form a suitable connection with a fluid line to which the apparatus of the present invention is to be connected. Of course, other conventional coupling means may be alternatively used such as flange mountings or the like. The pipe 29 has disposed therein a rigidly connected bushing 32 supporting and limiting movement of a throttling valve means 33 in accordance with a primary feature of the present invention.

Figure 2:
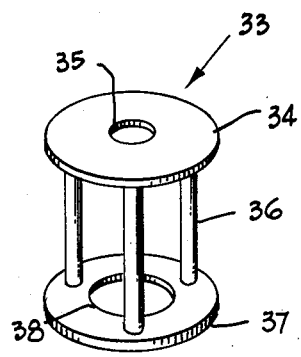
FIGURE 2 is an enlarged isometric view of the throttling valve means embodied in the apparatus of FIGURE 1.

The valve means 33 is more clearly shown in the view of FIGURE 2 and includes a disc member 34 designed to have a diameter so as to be supported by the upper end of the bushing 32 in the normal position thereof as indicated in FIGURE 1. The disc 34 defines therein a central opening or orifice 35. The disc has downwardly depending therefrom a plurality of circumferentially spaced rods 36. Preferably, three rods 36 are employed and spaced 120° apart. The rods 36 connect with a lower disc 37 defining an inner opening 38. The openings 35 and 38 perform a primary function in the present invention and are in most instances, according to the design requirements, considerably different in area. For example, in one application, the opening 35 is ⅜ inches in diameter and the opening 38 is 1⅜ inches in diameter such that the opening 38 is in the order of ten times the area of the opening 35. The disc 37, as clearly shown in FIGURE 1, is disposed below and spaced from the lower end of the bushing 32 such that the bushing 32 will limit movement of the valve 33 a given distance in the upward direction.

Figure 3:
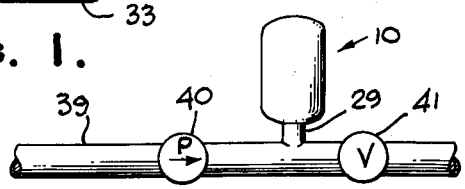
FIGURE 3 is a schematic view illustrating the location of the apparatus of FIGURE 1 in a fluid line.

The operation of the surge attenuating apparatus of the present invention may now be described. As shown in FIGURE 3, the surge attenuating apparatus of the present invention is normally applied to a line 39 having pump means 40 disposed therein. The surge dissipating apparatus of the present invention is positioned downstream of the pump 40. On the other side of the surge dissipator is disposed a valve means 41. It will be apparent that upon closure of the valve means 41 pressure waves will be set up in the line 39 which may cause water hammer or create damage to the line 39 or its coupled components.

As indicated in FIGURE 3, the apparatus of the present invention is normally disposed in a vertical position with the parts thereof as located in FIGURE 1. Of course, prior to installation, gas is forced through the line 16 and check valve 17 to the interior of the bellows 22 and the head sections 15 and 24. Preferably, the gas pressure within the bellows 22 is maintained at approximately five pounds above the normal line pressure. In consequence, in the normal position as shown in FIGURE 1, the bellows 22 will be biased towards its elongated position as indicated with only a limited amount of fluid being disposed in the casing 10 according to the pressure head in the line 39 at the point to which the pipe 29 is coupled.

In response to the pressure surges created by closure of the valve 41, the pressure increase will cause upward movement of the valve means 33 until the lower disc 37 impinges against the lower end of the bushing 32. In this position, fluid will flow through the throttling opening 38 and thereafter freely into the volume defined between the shroud 23, head 24, and the head 14 and shell 11. As a consequence, the head 24 and shroud 23 will be urged upwardly to in turn compress the bellows 22 a given amount according to the value of the pressure surges. The ring 25 coupled to the head 24 serves to limit the extent of contraction of the bellows 22 by contacting the lower end 21 of the liner 20.

Thereafter, as the pressure surges from the line 39 decrease, the gas within the bellows 22 will gradually expand and again force elongation of the bellows 22 until the head 24 impacts the stop ring 27, and more particularly the projecting flanges 28 thereof.

As the latter movement is occurring, the valve means 33 because of its own weight and also the greater area of the disc 34 relative to the disc 38 will move downwardly to its normal position, as shown in FIGURE 1. In this position, it will be evident that all of the fluid leaving the casing 10 must pass through the bleed off opening or orifice 35 before re-entering the pipe 29 to in turn pass into the line 39. Thus, the bleed off orifice 35 prevents the possibility of resurge into the line 39.

The drain holes 26 are provided in order to enable any fluid which may have passed into the area between the shroud 23 and the outer surface of the bellows 22 to escape by gravity to the annulus between the shroud 23 and the casing 11. The flanged portions 28 of the ring stop means 27 serve a similar function in allowing flow of fluid to pass in between the spaced flanges 28 around the ring stop and out through the pipe 29 back to the line 39. The ring stop 27 is so constructed so as to limit downward movement of the head 24 to a point slightly spaced from the upper disc 34.

It will be evident that the method and apparatus of the present invention embodies the performance of three important functions in relation to pressure surges resulting from sudden valve closure or the like in the fluid line. First of all, the kinetic energy of the pressure surges are first dissipated into fluid friction by forced flow through the decreased area of the opening 38. Secondly, another portion of the kinetic energy of the pressure surges is dissipated by polytropic compression of the gases within the bellows 22. Thereafter, as a third function of the present invention, the valve 33 by returning to its normal position of FIGURE 1 prevents resurge, as heretofore mentioned, by causing flow to pass through the restricted opening or orifice 35.

It is apparent that without the throttling opening 38 in disc 37 all of the kinetic energy of the pressure surges from line 39 would have to be dissipated by polytropic compression of the gas within bellows 22 (neglecting pipe friction in the line 39). As a consequence of embodying the throttling valve 33, the dimensions of the casing and bellows 22 may be correspondingly decreased; furthermore, by design calculations a determination can be made so as to have the optimum amount of energy absorbed by the bellows 22 and an optimum amount absorbed by fluid friction through the opening 38. Factors affecting this design calculation will, of course, be related to the cross-sectional area and length of the line 39, the specific gravity and normal pressure of the fluid flowing therethrough, the velocity of the fluid, and the rigidity of the pipe 39 in certain instances.

In certain instances, for example, in the event the fluid involved is water, the bellows construction may be eliminated and a water-air interface relied upon. Thus, in such applications the closed housing or chamber 10 would merely serve as a closed volume to effect a pressure increase in the air contained therein by the increased volume occupied by the water as a consequence of pressure surges in the line.

Figure 4:
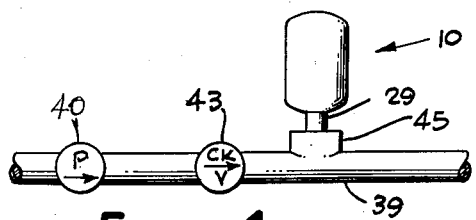
FIGURE 4 is a schematic representation of the apparatus of the present invention incorporated in a different fluid line application; and, FIGURE 5 is a sectional view of a modified form of the throttling valve means.

It will be apparent that the apparatus of the present invention may be modified for reversed applications. Thus, in FIGURE 4, there is shown line 39 as embodying therein a pump 40 and conventional check valve 43 preventing reverse flow therethrough. Thus, in the event of failure of the pump, a sudden pressure drop will occur in that portion of line 39 downstream of the pump. As a consequence under such conditions the bellows 22 would normally be maintained in a partially compressed condition by having the gas therein at a pressure below line pressure.

Figure 5:
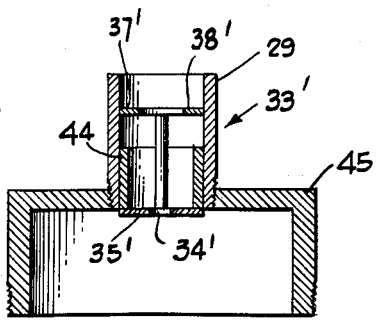

Upon failure or stoppage of pump 40, fluid will be drawn into the line 39 from the casing 10. Thus, as shown in FIGURE 5, the valve means 33' must be inverted. Also a bushing 44 must be disposed in the pipe connection 29 so as to normally limit upper movement of the disc 34' having aperture 35' similar to aperture 35. Thus, upon failure of pump 40 and elongation of bellows 22 because of decreased pressure in the line 39, the valve means 33' in FIGURE 5 will be forced downwardly to throttle flow into the line through the larger opening 38' in disc 37'. Thereafter upon build-up of pressure in line 39, the bleed-off orifice in disc 34' will prevent resurge into casing 10.

In order to enable proper throttled flow into line 39 through valve means 33', an increased diameter connection 45 must be interposed between pipe 29 and the line 39 as shown.

It is, therefore, believed that the present invention for a method and apparatus of attenuating sudden pressure surges in a fluid line enables a simplified, maintenance-free structure of rugged design to accommodate limited space requirements. Of course, other changes and modifications may be made without departing from the spirit

What is claimed is:

1. An apparatus for attenuating sudden pressure surges in a fluid line, said apparatus comprising: a closed casing; a fluid line; a branch fluid passage communicating between the interior of said casing and said fluid line; throttle valve means interposed in said fluid passage to frictionally absorb a part of the kinetic energy of said pressure surges, said throttle valve means being movable to a first position solely in response to said pressure surges and to a second position solely in response to a falling off of said surges, and said throttle valve means further embodying a restricted opening in said second position whereby resurges are prevented to said line; compressible means coupled to and disposed within said casing, said compressible means being adapted to absorb another part of the kinetic energy characterizing said pressure surges.

2. An apparatus for attenuating sudden pressure surges in a fluid line, said apparatus comprising: a closed casing; a branch fluid passage communicating between the interior of said casing and said fluid line; throttle valve means interposed in said branch fluid passage and positioned for free movement between a first normal position and a second surge responsive position; stop means interposed in said passage and co-functioning with said valve means to define said first position and said second position; said valve means defining a first opening of given cross sectional area for limiting flow of said fluid therethrough in said first normal position and a second opening of larger cross sectional area for limiting flow of fluid therethrough in said second surge responsive position.

3. An apparatus for attenuating sudden pressure surges in a fluid line, according to claim 2, in which said valve means comprises: a first member defining said first given opening; a second member defining said second given opening; supporting means connecting and spacing said first member and said second member; and in which said first member is disposed within said chamber in said second position.

4. An apparatus for attenuating sudden pressure surges in a fluid line, according to claim 2, and deformable means coupled to and disposed within said casing.

5. An apparatus for attenuating sudden pressure surges in a fluid line, according to claim 4, in which said deformable means comprises bellows; and means for filling said bellows with gas at a given pressure.

6. An apparatus for attenuating sudden pressure surges in a fluid line, according to claim 5, and means for guiding and limiting movement of said bellows in response to pressure surges of said fluid.

References Cited in the file of this patent
UNITED STATES PATENTS

| | | |
|---|---|---|
| 1,294,380 | Benson | Feb. 18, 1919 |
| 1,836,682 | Ray | Dec. 15, 1931 |
| 1,990,493 | Loughead et al. | Feb. 12, 1935 |
| 2,411,315 | Ashton | Nov. 19, 1946 |
| 2,571,279 | Myklestad | Oct. 16, 1951 |
| 2,756,989 | Peras | July 31, 1956 |
| 2,801,067 | Mercier | July 30, 1957 |
| 2,802,664 | Jackson | Aug. 13, 1957 |